UNITED STATES PATENT OFFICE.

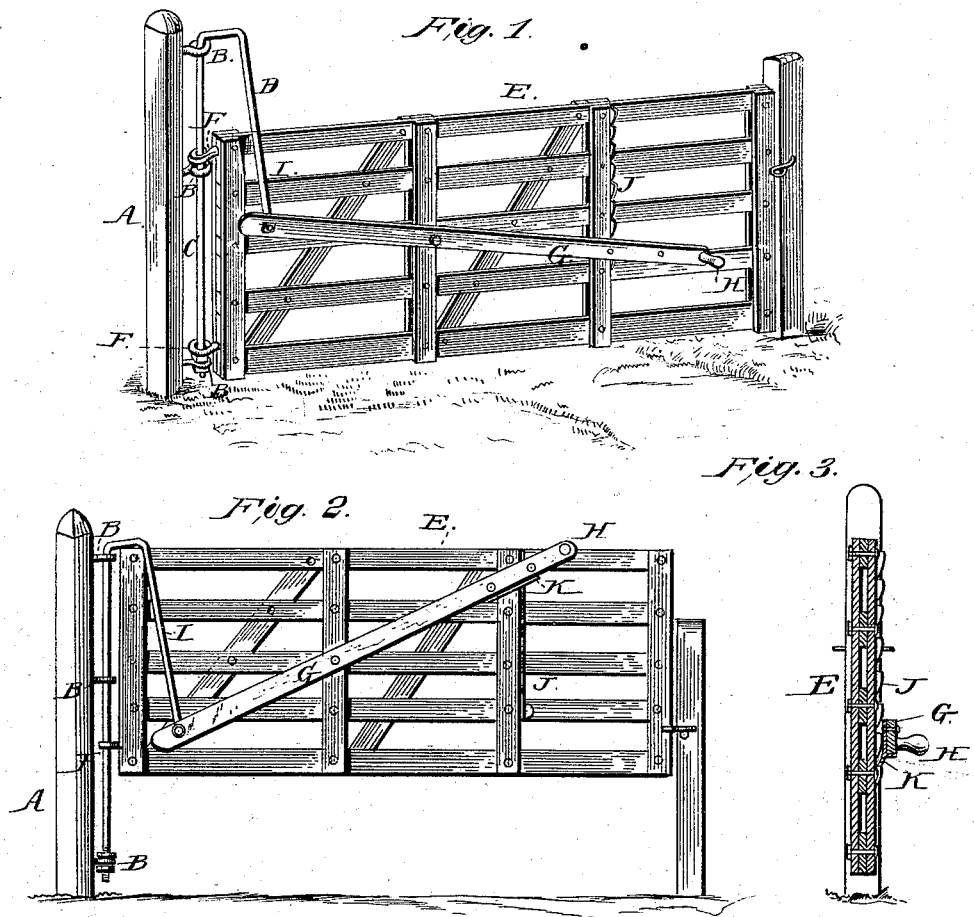

JOBE HAGERMAN, OF FAIRFIELD, MICHIGAN, ASSIGNOR OF ONE-HALF HIS RIGHT TO RICHARD M. LIVESAY, OF SAME PLACE.

IMPROVEMENT IN FARM-GATES.

Specification forming part of Letters Patent No. 219,577, dated September 16, 1879; application filed July 22, 1879.

*To all whom it may concern:*

Be it known that I, JOBE HAGERMAN, of Fairfield, in the county of Lenawee and State of Michigan, have invented certain new and useful Improvements in Farm-Gates; and I do hereby declare that the following is a full, clear, and exact description of the invention, which will enable others skilled in the art to which it appertains to make and use the same, reference being had to the accompanying drawings, which form a part of this specification.

Figure 1 is a perspective view. Fig. 2 is a side view, showing the gate elevated; and Fig. 3 is a cross-section.

Corresponding parts in the several figures are denoted by like letters of reference.

This invention relates to that class of gates which may be raised or lifted to a certain height before being opened, so as to pass readily over snow or any other obstruction which may happen to be on the ground; and it consists in certain improvements in the construction of the same, which will be hereinafter fully described, and particularly pointed out in the claim.

In the drawings, A represents a post, having suitable eyes or bearings B B for one leg, C, of a bail or bent rod, D.

The gate E, which may be of any suitable construction, is provided with eyes or bearings F F, by which it is hinged or journaled upon the part C of bail D.

Upon the side of the gate is pivoted a lever, G, provided near the free or swinging end of the gate with a handle, H. The opposite end of the lever is pivoted to the lower end of the leg I of bail D.

It will thus be seen that by operating the lever the gate may be raised or lowered to any suitable height.

The bail D may be made of round iron, or of other material sufficiently elastic to permit the slight lateral movement caused to the lower end of leg I in operating the gate.

To sustain the gate at any desired elevation, I provide it upon the side with a rack or ratchet bar, J, engaging a catch, K, upon lever G.

This invention is simple, durable, and easily operated; and the lifting attachment may be easily applied to any ordinarily-constructed gate now in use without much expense.

I am aware of the patent to Bennett, August 7, 1877, and I claim nothing therein shown; but,

Having thus described my invention, I claim and desire to secure by Letters Patent of the United States—

The combination of bail C D, post A, hinged gate E, and lever G, the latter being pivoted to the gate and attached at one end to the leg of the bail and free at the other, as described.

In testimony that I claim the foregoing as my own I have hereto affixed my signature in presence of two witnesses.

JOBE HAGERMAN.

Witnesses:
DAVIS D. BENNET,
RICHARD M. LIVESAY.